US010954781B2

(12) United States Patent
Logan et al.

(10) Patent No.: US 10,954,781 B2
(45) Date of Patent: Mar. 23, 2021

(54) MULTI-MODE CONTROL OF DOWNHOLE TOOLS

(71) Applicant: EVOLUTION ENGINEERING INC., Calgary (CA)

(72) Inventors: Aaron W. Logan, Calgary (CA); Justin C. Logan, Calgary (CA); Barry D. Buternowsky, Calgary (CA); Steven D. McLawchlin, Magnolia, TX (US); David A. Switzer, Calgary (CA); Kurtis Kenneth Lee West, Calgary (CA)

(73) Assignee: Evolution Engineering Inc., Calgary (CA)

( * ) Notice: Subject to any disclaimer, the term of this patent is extended or adjusted under 35 U.S.C. 154(b) by 340 days.

(21) Appl. No.: 16/066,031

(22) PCT Filed: Jan. 27, 2017

(86) PCT No.: PCT/CA2017/050089
§ 371 (c)(1),
(2) Date: Jun. 25, 2018

(87) PCT Pub. No.: WO2017/127932
PCT Pub. Date: Aug. 3, 2017

(65) Prior Publication Data
US 2019/0003302 A1   Jan. 3, 2019

Related U.S. Application Data
(60) Provisional application No. 62/287,801, filed on Jan. 27, 2016.

(51) Int. Cl.
G01V 1/44 (2006.01)
G01V 3/30 (2006.01)
(Continued)

(52) U.S. Cl.
CPC .............. E21B 47/18 (2013.01); E21B 47/10 (2013.01); E21B 47/13 (2020.05); G01V 1/44 (2013.01);
(Continued)

(58) Field of Classification Search
CPC .......... E21B 47/18; E21B 47/13; E21B 47/10; G01V 1/44; G01V 3/30; G01V 2210/1429
See application file for complete search history.

(56) References Cited

U.S. PATENT DOCUMENTS 4,355,310 A   10/1982   Belaigues et al.
4,788,544 A   11/1988   Howard
(Continued)

FOREIGN PATENT DOCUMENTS

CA        3009398 A1 *  8/2017 ............... G01V 1/44
WO   WO-2017127932 A1 *  8/2017 ............. E21B 47/18

Primary Examiner — Daniel Pihulic
(74) Attorney, Agent, or Firm — Oyen Wiggs Green & Mutala LLP

(57) ABSTRACT

A method for establishing downlink telemetry communication to a downhole system involves placing into a drillstring a telemetry transcoder, and advancing the drillstring so the telemetry transcoder is below the surface. The method then transmits downlink EM telemetry signals from surface equipment. These signals are received at the telemetry transcoder which retransmits the signals as mud pulse signals. The mud pulse signals are received at the downhole system.

31 Claims, 6 Drawing Sheets

(51) Int. Cl.
    *E21B 47/18*    (2012.01)
    *E21B 47/12*    (2012.01)
    *E21B 47/10*    (2012.01)
    *E21B 47/13*    (2012.01)

(52) U.S. Cl.
    CPC ........ *G01V 3/30* (2013.01); *G01V 2210/1429* (2013.01)

(56) References Cited

U.S. PATENT DOCUMENTS

| | | | |
|---|---|---|---|
| 2004/0020063 A1* | 2/2004 | Lewis | E21B 47/01 33/313 |
| 2004/0156264 A1 | 8/2004 | Gardner et al. | |
| 2006/0214814 A1 | 9/2006 | Pringnitz et al. | |
| 2009/0251331 A1 | 10/2009 | Wassermann et al. | |
| 2019/0003302 A1* | 1/2019 | Logan | G01V 3/30 |
| 2019/0154866 A1* | 5/2019 | Switzer | E21B 47/13 |

* cited by examiner

MULTI-MODE CONTROL OF DOWNHOLE TOOLS

CROSS-REFERENCE TO RELATED APPLICATIONS

This application claims priority from U.S. application Ser. No. 62/287,801 filed 27 Jan. 2016. For purposes of the United States, this application claims the benefit under 35 U.S.C. § 119 of U.S. application Ser. No. 62/287,801 filed 27 Jan. 2016 and entitled MULTI-MODE CONTROL OF DOWNHOLE TOOLS which is hereby incorporated herein by reference for all purposes.

TECHNICAL FIELD

This application relates to subsurface drilling, specifically, to apparatus for uplink and/or downlink telemetry of data between surface and downhole equipment. Embodiments provide methods and apparatus suitable for use in directional drilling and measurement while drilling operations. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electromechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically suspended in a bore of a drill string near the drill bit. Some downhole probes are highly specialized and expensive.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

Despite advances that have been made in the field, it remains exceedingly challenging to reliably and quickly transmit data from downhole locations by EM telemetry, especially in cases where the wellbore is deep, inclined (e.g. horizontal), and/or passes through formations that have undesirable properties for EM telemetry (e.g. formations that have high electrical conductivity). There is a need for ways to provide EM telemetry that provide improved reliability.

SUMMARY

The invention has a number of different aspects. These include, without limitation, multi-mode gap subs, multi-mode downhole telemetry apparatuses, telemetry transcoders, methods for communicating with downhole tools, methods of communicating by multiple modes of telemetry, drilling rigs having multi-mode telemetry communication, methods of installing downhole tools, transcoders and methods of installing transcoders.

One example aspect provides a telemetry transcoder comprising an electromagnetic (EM) telemetry receiver and a mud pulse (MP) telemetry transmitter. The EM telemetry receiver comprises plural electrodes and an electrical potential monitor connected to measure one or more electrical potentials between the electrodes. A buffer is connected to store data received by the EM telemetry receiver. A controller is configured to retransmit data from the buffer by way of the MP telemetry transmitter conditionally and to suppress retransmission of the data in response to receiving an acknowledgement indicating receipt of the data by a downhole tool.

In some embodiments the controller is configured to distinguish between commands and non-command numerical data in the received data and to process the non-command numerical data to reduce a size of the non-command numerical data before retransmitting the non-command numerical data. Processing the non-command numerical data may comprise, for example, rounding the non-command numerical data and/or compressing the non-command numerical data.

In some embodiments the telemetry transcoder comprises a flow sensor and the controller is connected to monitor output from the flow sensor and to commence transmitting the received data in response to detecting an onset of flow. The controller may be configured to wait for a time after detecting the onset of flow before retransmitting the data. The flow sensor may comprise a pressure sensor and/or other type of flow sensor.

In some embodiments the controller comprises a command translator configured to identify a command in the received data and replace the command with a corresponding command before retransmitting the data.

In some embodiments the telemetry transcoder is packaged for connecting inline with a drill string. For example, the telemetry transcoder may comprise a gap sub wherein the electrodes are connected to opposing ends of the gap sub. The gap sub may include couplings (for example tapered threaded couplings) on opposed ends of the gap sub.

Another example aspect provides a method for data telemetry comprising: transmitting data from surface equipment by electromagnetic (EM) telemetry; and receiving the data at a telemetry transcoder located below surface and above a downhole tool. At the telemetry transcoder the data is received and buffered and, in response to not receiving an acknowledgement from the downhole tool, the method involves retransmitting the data from the telemetry transcoder by mud pulse telemetry. Retransmitting the data may be suppressed in response to receiving the acknowledgement from the downhole tool. The acknowledgement may be received, for example, by detecting an EM signal comprising the acknowledgement or detecting a pressure signal comprising the acknowledgement.

In some embodiments the data is received at the telemetry transcoder at a first data rate and retransmitting the data comprises retransmitting the data at a second data rate lower than the first data rate.

In some embodiments the method comprises, at the telemetry transcoder, processing the data to identify a command and replacing the command with a corresponding command before retransmitting the data.

In some embodiments the method comprises, at the telemetry transcoder, processing the data to identify non-command numerical data and processing the non-command numerical data to reduce a size of the non-command numerical data before retransmitting the data. Processing the non-command numerical data may comprise, for example, rounding the non-command numerical data to a lower precision and/or compressing the non-command numerical data.

In some embodiments the method comprises, at the telemetry transcoder, detecting onset of a flow on condition and, in response to detecting the flow on condition, commencing retransmitting the data. The method may comprise waiting for a period after detecting the flow on condition before commencing retransmitting the data.

In some embodiments the telemetry transcoder is deployed while drilling a wellbore. For example, the method may comprise drilling a wellbore using a drill string that includes the downhole tool, adding the telemetry transcoder to the drill string, and continuing drilling until the telemetry transcoder is downhole by at least a desired distance before transmitting the data. Optionally the method includes, after the telemetry transcoder is downhole by at least the desired distance changing an encoding of the data transmitted from the surface equipment. Changing the encoding may, for example, include changing a number of cycles per bit, for example by increasing the number of cycles per bit to 20 or more cycles per bit.

In some embodiments the telemetry transcoder is at least a predetermined distance such as 5 m below the surface when it receives the data.

Another example aspect provides a multi-mode downhole telemetry apparatus for receiving electromagnetic telemetry signals or mud pulse telemetry signals. The apparatus may comprise one or more sensors and an uplink telemetry transmitter (e.g. an electromagnetic telemetry transmitter or a mud pulse telemetry transmitter). A controller may be configured to receive signals and cause the sensors to take one or more readings which may be transmitted uphole via the uplink telemetry transmitter.

Another example aspect provides a multi-mode gap sub comprising an electrically conductive first portion having a first coupling end and an electrically conductive second portion having a second coupling end. The first portion may be connected to the second portion by an electrically insulating gap. An electromagnetic receiver may be connected to the first portion and the second portion and a mud pulse transmitter may be connected to either or both of the first and second portions. A controller may be connected to the electromagnetic receiver and to the mud pulse transmitter. The controller may be configured to relay signals received by the electromagnetic receiver to the mud pulse transmitter.

Another example aspect provides a method for communicating to a downhole tool, the method comprising installing a transcoder in a drill string, transmitting electromagnetic downlink commands by electromagnetic telemetry at an uphole location, receiving the electromagnetic downlink commands at the transcoder, transmitting mud pulse downlink commands at the transcoder by mud pulse telemetry, and receiving the mud pulse downlink commands at a downhole tool.

Another example aspect provides a method for controlling a downhole tool. The method comprises transmitting a command for the downhole tool from surface equipment by electromagnetic (EM) telemetry and receiving the command at a telemetry transcoder located in a wellbore below surface and above the downhole tool. In some cases the telemetry transcoder is located close to the surface (e.g. at a depth of less than 200 m and/or a depth of at least a few meters and/or a depth in the range of about 2 to 20 meters and/or a depth of 5 to 10 meters). The method further provides at the telemetry transcoder, translating a mud pulse command signal corresponding to the command and transmitting the mud pulse command signal by mud pulse telemetry.

Another aspect provides apparatus having any new and inventive feature, combination of features, or sub-combination of features as described herein.

Another aspect provides methods having any new and inventive steps, acts, combination of steps and/or acts or sub-combination of steps and/or acts as described herein.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
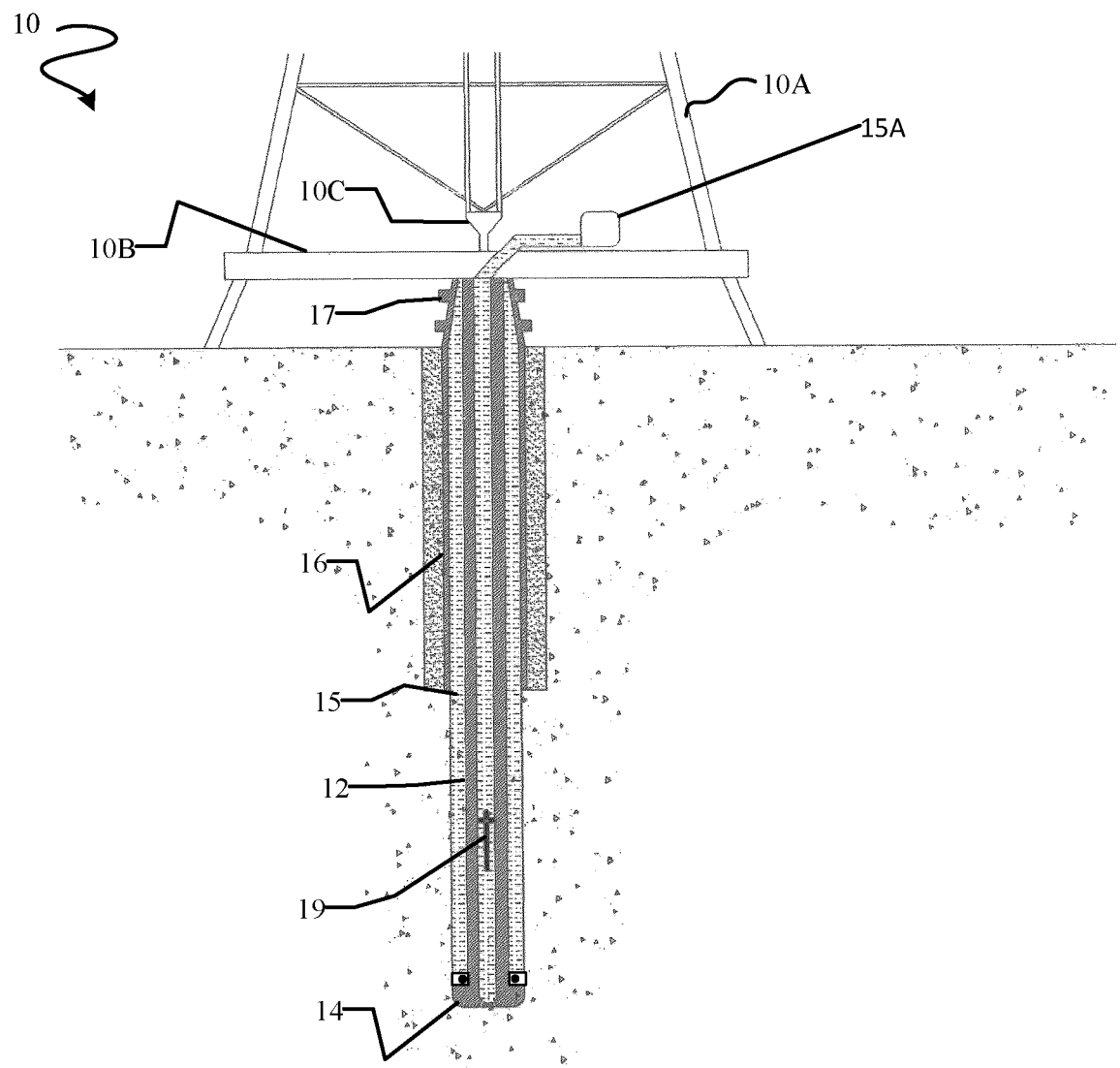
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

A gap sub 19 may be positioned, for example, at the top of the BHA. Gap sub 19 divides the drill string into two electrically-conductive parts that are electrically insulated from one another. The two parts form a dipole antenna structure. For example, one part of the dipole may be made of the BHA up to the electrically insulating gap and the other part of the dipole may be made up of the part of the drill string extending from the gap to the surface.

A very low frequency alternating current (AC) electrical signal is generated by an EM telemetry signal generator and applied across gap sub 19. The low frequency AC signal energizes the earth and creates an electrical field which results in a measurable voltage differential between the top of drill string 12 and one or more grounded electrodes (such as ground rods or ground plates). The electrical signal is varied in a way which encodes information for transmission by uplink EM telemetry.

Figure 2:
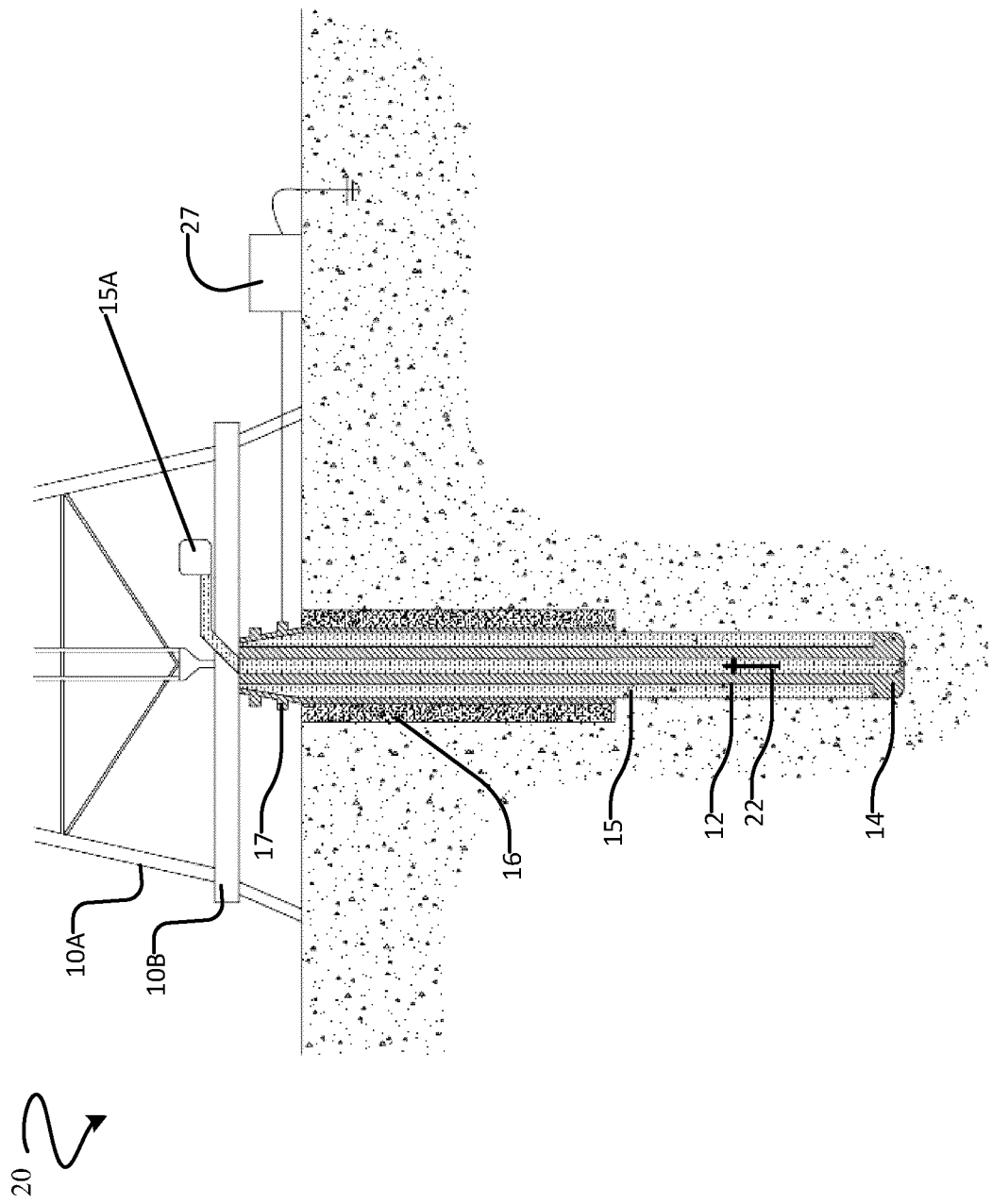
FIG. 2 illustrates drilling equipment according to an example embodiment of the invention.

FIG. 2 illustrates drilling equipment 20 according to an example embodiment of the invention. Features of drilling equipment 20 that are also shown in FIG. 1 are identified using the same reference numbers. Equipment 20 includes a downhole tool 22 which is coupled into drill string 12. Downhole tool 22 may be, but is not necessarily, part of a bottom hole assembly which forms the downhole end of the drill string. Downhole tool 22 may be packaged in any of a wide number of ways. For example, downhole tool 22 may include components contained in a housing carried in the bore of drillstring 12 and/or components carried in one or more compartments built into a wall of drillstring 12 and/or components carried in one or more packages attached on an outside of drillstring 12. Downhole tool 22 includes an EM telemetry transmitter connected across a gap in a gap sub in some embodiments.

Figure 2A:
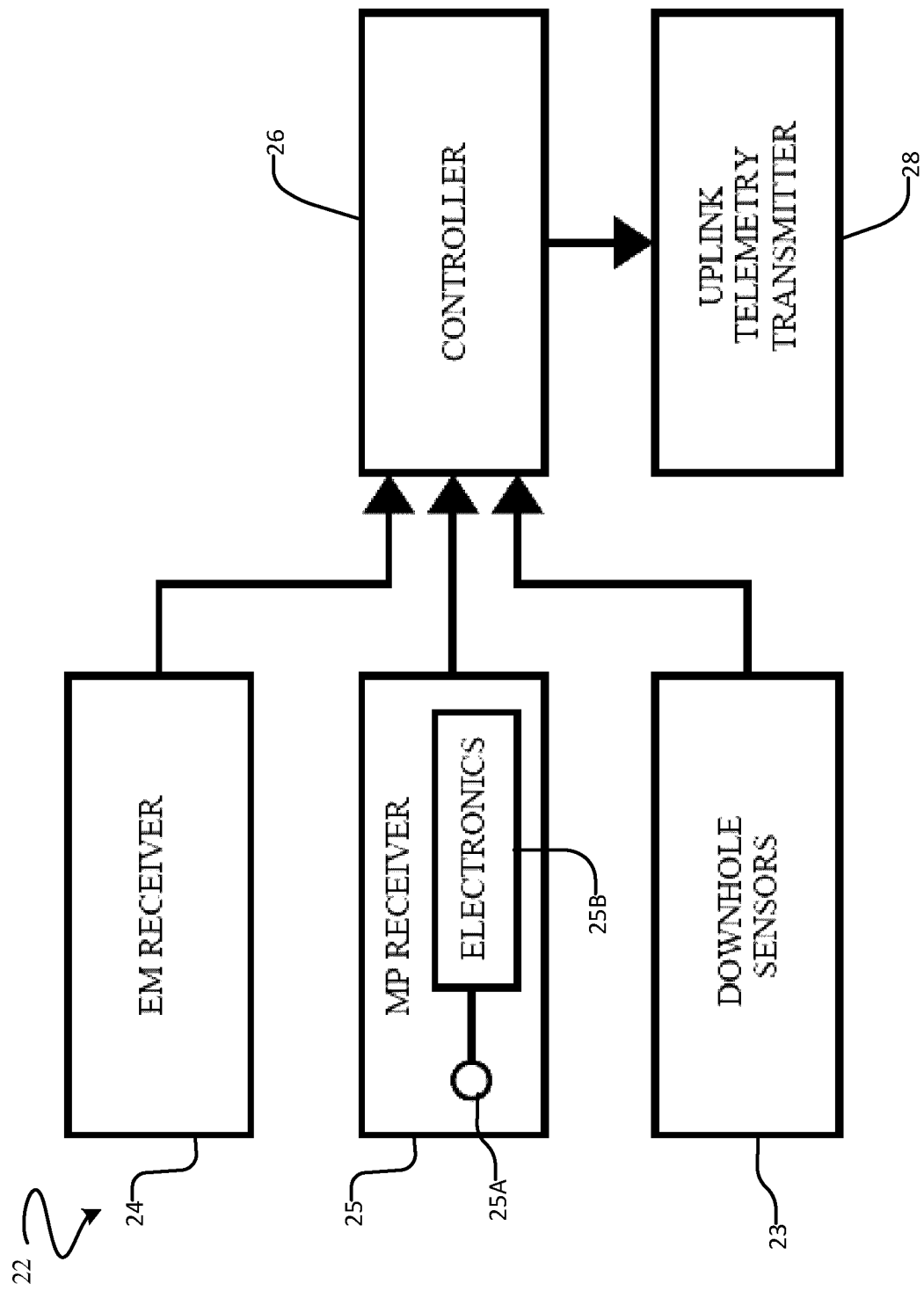
FIG. 2A is a block diagram showing functional components of an example downhole tool.

FIG. 2A is a block diagram showing functional components of an example downhole tool 22. Downhole tool 22 comprises a downlink EM telemetry receiver 24 as well as a mud pulse telemetry receiver 25. Mud pulse telemetry receiver 25 comprises a pressure sensor 25A which monitors pressure of drilling fluid in a bore of drill string 12 and electronics 25B which monitor fluctuations in the measured pressure. The fluctuations may comprise positive pulses (i.e. cases in which the measured pressure exceeds a steady state pressure) or negative pulses (i.e. cases in which the measured pressure is lower than a steady state pressure). Downhole tool 22 also includes a controller 26 which is configured to take some action in response to receiving downlink telemetry signals. In the illustrated embodiment, controller 26 is connected to receive both signals from mud pulse telemetry receiver 25 and EM telemetry receiver 24. It is not mandatory that a single controller be provided. In an alternative embodiment, controller 26 includes separate parts which process signals from downlink EM telemetry receiver 24 and downlink mud pulse telemetry receiver 25, respectively.

Controller 26 may, for example, be configured to energize some part of downhole tool 22 in response to receiving a downlink telemetry signal.

Controller 26 may be implemented in various ways. It is typically most convenient for controller 26 to comprise a data processor which executes software instructions stored on a memory device accessible to the processor to perform the functions of controller 26. In addition or in the alternative, controller 26 may comprise hardware circuits which implement logic for performing some processing steps. The hardware may comprise, for example, hard-wired logic circuits and/or configured configurable logic circuits such as FPGAs configured to perform and/or assist in performing the functions of controller 26.

Equipment 20 also includes a downlink telemetry transmitter 27 located at the surface. Downlink telemetry transmitter 27 may, for example, apply a varying electrical potential between conductors that are in contact with the earth, for example, the potential may be applied between the top end of drill string 12 and one or more ground rods. This electrical potential may induce electrical currents and/or fields in the earth that can be detected by the downlink electromagnetic telemetry receiver 24 of downhole tool 22.

In the illustrated embodiment, downhole tool 22 comprises various downhole sensors 23 which yield output signals accessible to controller 26 and an uplink telemetry transmitter 28. Sensors 23 may be any sensors known in the art or later developed and could include, for example, one or more of: shock sensors, RPM sensors, flow sensors, direction and inclination sensors, accelerometers, magnetometers, gamma logging sensors, pressure sensors, resistivity sensors, temperature sensors, fluid property sensors, neutron sensors, and the like. Controller 26 may be caused (for example by suitable software and/or firmware instructions) to read output values from one or more of sensors 23 and to:
- transmit those output values, or values derived from those output values, by way of uplink telemetry transmitter 28;
- log the output values to a memory device; and/or
- take some other action on the output values.

In normal operation, downhole tool 22 is controlled by way of downlink telemetry signals from EM telemetry transmitter 27. The downlink telemetry signals may comprise codes that cause downhole tool 22 to perform any of various actions including things such as:
- wake up or energize part of downhole tool 22;
- switch to a particular desired operating mode;
- transmit certain data by using an uplink telemetry system 28 (either or both acquired data or diagnostic data);
- switch from using one uplink telemetry system to using another uplink telemetry system;
- change various modulation parameters, including but not limited to the frequency, bit rate, encoding modulation type, power transmission level, and pulse width;
- enter a power-saving mode with or without reduced functionality; and/or
- go to sleep;
- etc.

There may be some circumstances in which downhole tool 22 is impaired in its ability to receive signals transmitted by downlink telemetry transmitter 27. For example, downhole tool 22 may be located in a formation which has an increased electrical conductivity. This increased electrical conductivity may attenuate electromagnetic signals at the location of downhole tool 22. As another example, electromagnetic telemetry receiver 24 may be inoperative or suffering from a malfunction which reduces its sensitivity. One aspect of the invention provides apparatus and methods for addressing the case where downhole tool 22 is not able to receive EM telemetry downlink signals from downlink telemetry transmitter 27.

Figure 3:
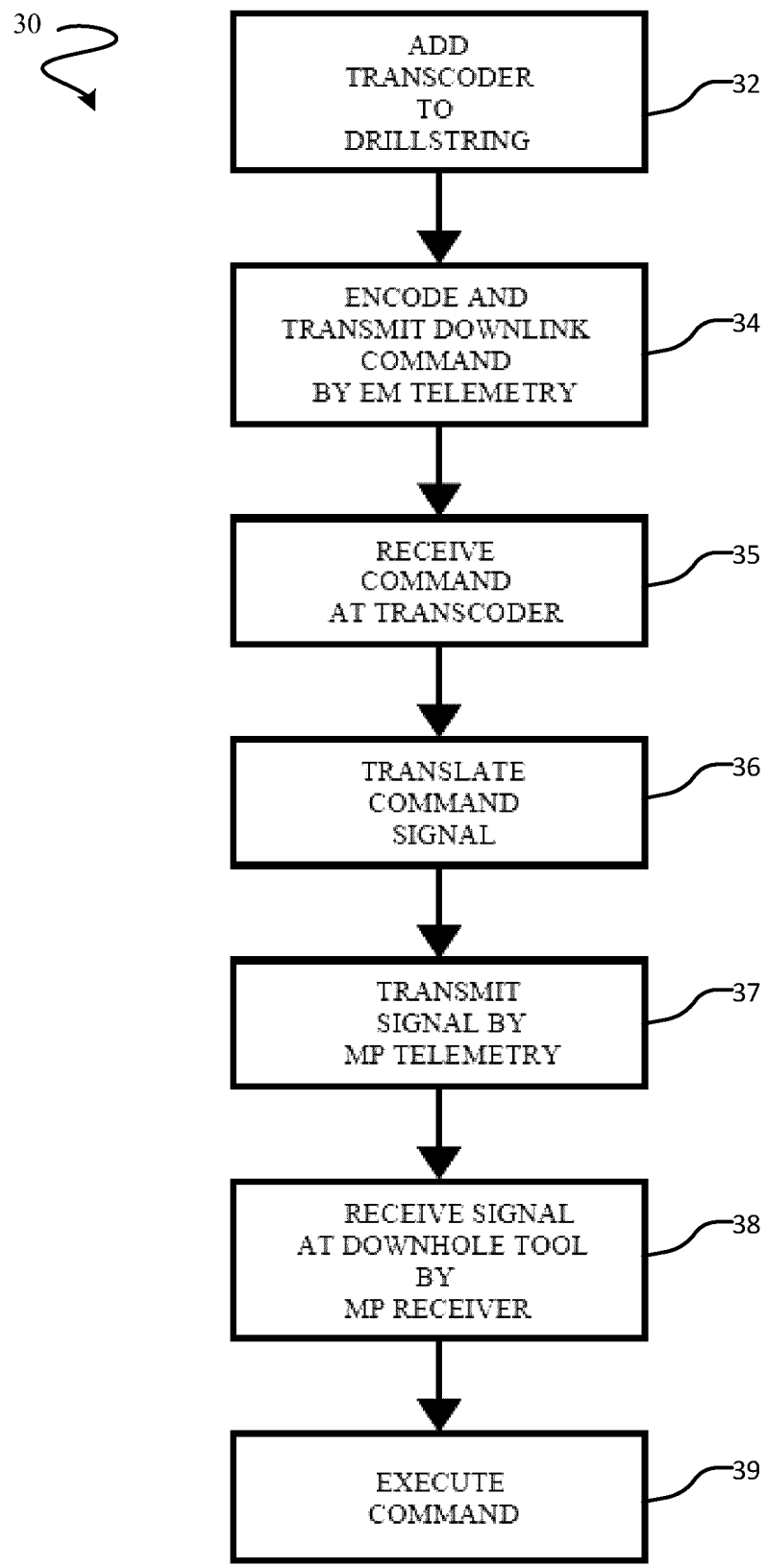
FIG. 3 is a flow chart illustrating a method according to an example embodiment.

FIG. 3 is a flow chart illustrating a method 30 according to an example embodiment. Block 32 comprises providing, in the drill string near the earth surface, a telemetry transcoder. Features of an example telemetry transcoder 40 are described below. The telemetry transcoder is an apparatus which is capable of receiving a downlink EM telemetry signal, converting that signal into a form suitable for transmitting by mud pulse telemetry, and transmitting the converted signal by mud pulse telemetry so that the signal may be received and acted upon by downhole tool 22 using mud pulse telemetry receiver 25.

In block 34, a downlink command is encoded at downlink telemetry transmitter 27 and transmitted by EM telemetry. In block 35, the signal is received by an EM telemetry receiver at the telemetry transcoder. At block 36, the signal is translated into a form suitable for transmission by MP telemetry. At block 37, the translated signal is transmitted by MP telemetry. In some embodiments, block 37 comprises transmitting negative pressure pulses in the fluid in the bore of drill string 12.

At block 38, the MP telemetry signal is received by MP telemetry receiver 25 at downhole tool 22. At block 39, downhole tool 22 takes action as commanded by the received signal.

In some embodiments, the telemetry transcoder is introduced into the drill string at a time after it has been detected that the downhole tool 22 is failing to receive downlink EM telemetry transmissions. In such cases, the telemetry transcoder may be installed into the drill string and drilling may be resumed until the telemetry transcoder is a suitable distance below the surface. For example, in some embodiments, the telemetry transcoder is more than 5 metres below the surface, or more than 10 metres below the surface, when it receives the downlink telemetry transmission.

In some embodiments the transcoder is located outside the metal casing of the drill string to ensure that the telemetry transcoder receives the EM signal from downlink telemetry transmitter 27. Receipt of the EM signal while the transcoder is inside the metal casing may be possible, but it is not always reliable or repeatable. To improve reception of EM signals while the transcoder is located within the casing, an increased number of cycles per bit may be employed to ensure that the EM signal from downlink telemetry transmitter is accurately received. For example, the protocol of downlink telemetry transmitter 27 may be modified to increase the number of cycles used to transmit each bit. When the transcoder is located within the casing the number of cycle bits may be increased for example to 20 to 50 cycles per bit, or 50 to 100 cycles per bit, or more. In some embodiments, a user interface at the surface includes a control for adjusting the downlink protocol. This control may be used to change the protocol for better reception of downlink telemetry signals when the transcoder is within the casing.

In some embodiments, MP telemetry pulses may be transmitted from the surface directly to MP telemetry receiver 25 of downhole tool 22, thus eliminating the need for the telemetry transcoder to be installed. For example, a pulser may be provided at surface downstream from the pumps used to circulate drilling fluid through the drill string.

In some circumstances, continuous access to downhole tool 22 by downlink telemetry transmission is not required. For example, a single downlink telemetry transmission or set of downlink telemetry transmissions may set downhole tool 22 operating in a desired mode. Subsequent to that the downhole tool 22 may continue operating without the requirement of further control by way of downlink telemetry transmissions. In such cases, the telemetry transcoder is optionally removed from the drill string after downhole tool 22 has received the necessary downlink telemetry transmission. The telemetry transcoder may optionally act as a backup MWD tool on a worksite, as it may have the same electronics and mechanics as downhole tool 22.

In some embodiments, the telemetry transcoder is battery powered. In many cases, it is only necessary for the telemetry transcoder to run long enough to transmit a few instructions. In such cases the battery power supply may have a relatively small capacity. After the batteries die the telemetry transcoder may optionally be left in the drill string.

The valve of the telemetry transcoder could potentially cause interference in the case where the telemetry transmitter is left in the drill string. If the valve is of the type that restricts fluid flow to create pulses, it may be configured to have no restriction (or almost no restriction) when set to a fully open position. In some embodiments, the fully open position is stable so as not to require any power to maintain the valve fully open and so as not to affect fluid flow. If the valve is of the type that increases fluid flow to create pulses, it may be maintained in the closed position to thereby cause minimal interference. In some embodiments, the closed position is a stable position so as not to require any power to maintain the valve closed, not to be affected by fluid flow and to avoid washing out the drill string.

In some embodiments, telemetry transcoder 40 is incorporated into a sub which can be coupled into drill string 12 between other segments of drill string 12. The sub may, for example, incorporate API standard threaded couplings at its ends. In some embodiments, the sub is a gap sub comprising electrically-conductive uphole and downhole parts that are mechanically attached to one another but electrically insulated from one another.

Employing transcoder 40 may allow for constant and efficient transmission to downhole tool 22 by making use of the advantages of EM telemetry and the advantages of MP telemetry. For example, EM telemetry may be easier to deploy and may allow for data to be transmitted at higher data rates but may not function in some conditions and beyond some ranges. MP telemetry may then be employed when EM telemetry is not suitable to maintain communication.

Figure 4:
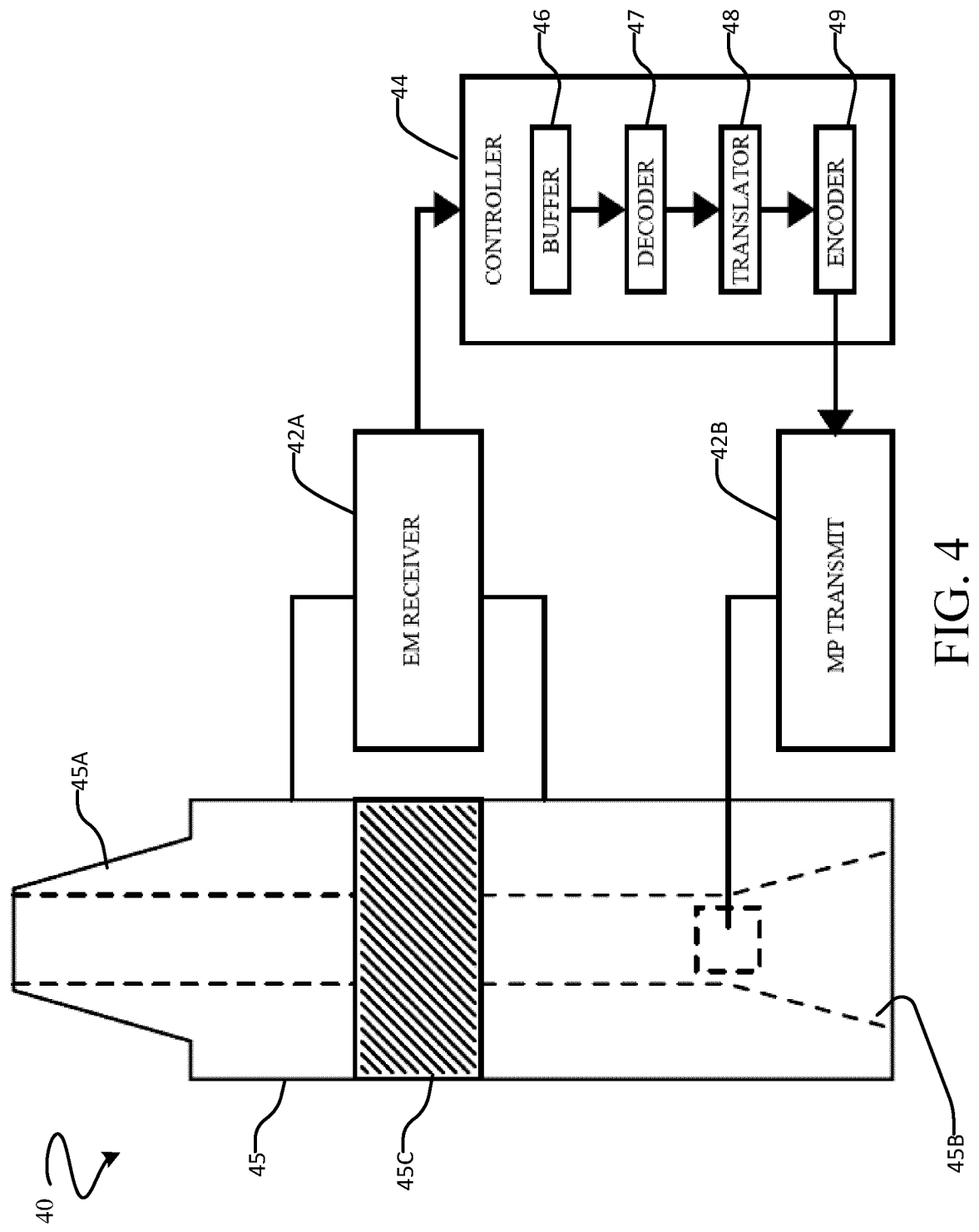
FIG. 4 is a block diagram showing an example telemetry transcoder.

FIG. 4 is a block diagram illustrating an example telemetry transcoder 40. Telemetry transcoder 40 includes a downlink EM telemetry receiver 42A, a downlink MP telemetry transmitter 42B, and a controller 44. Controller 44 is configured to receive signals from EM telemetry receiver 42A, if necessary, convert those signals into a different form suitable for encoding as MP telemetry transmissions, and then retransmit the signals using MP telemetry transmitter 42B. The use of telemetry transcoder 40 permits seamless control of downhole tool 22 from downlink telemetry transmitter 27. No change to the operation of downlink telemetry transmitter 27 is required whether or not downhole tool 22 is currently capable of receiving downlink EM telemetry signals.

Controller 44 may be implemented in various ways. It is typically most convenient for controller 44 to comprise a data processor which executes software instructions stored on a memory device accessible to the processor to perform the functions of controller 44. In addition or in the alternative, controller 44 may comprise hardware circuits which implement logic for performing some processing steps. The hardware may comprise, for example, hard-wired logic circuits and/or configured configurable logic circuits such as FPGAs configured to perform and/or assist in performing the functions of controller 44.

In some embodiments, controller 44 includes a buffer 46 which can be used to account for the difference in speed between downlink electromagnetic telemetry transmissions and downlink MP telemetry transmissions. The buffer may also or in the alternative be used to store data received by EM telemetry while flow is off (and therefore it is not possible to send data by MP telemetry until flow is resumed). As EM telemetry transmissions are received at telemetry transcoder 40, the received signals may be stored in buffer 46 and then retransmitted at a slower rate of which MP telemetry transmitter 42B is capable. For example, buffer 46 may store EM signals received by EM receiver 42A when drilling fluid is not flowing through the drill string, then store those signals until the drilling fluid is flowing and they may be transmitted by MP telemetry transmitter 42B.

In some embodiments, signals received by EM telemetry at telemetry transcoder 40 are stored in buffer 46. Controller 44 may be configured to delay sending the received signals by MP telemetry until it has determined that the EM telemetry tools were not received by downhole tool 22. For example, controller 44 may wait for an "ACK" or acknowledgement signal from downhole tool 22. If no such signal is received controller 44 may proceed to transmit the signal from buffer 46 by MP telemetry. If an ACK signal is received, then controller 44 may delete or skip over the data in buffer 46 to which the ACK signal relates. Where telemetry transcoder receives data by EM telemetry and buffers that data while flow is off, controller 44 may automatically detect a change to a flow on condition (e.g. by monitoring a pressure sensor or flow sensor) and may automatically commence transmitting the buffered data by MP telemetry once flow has been established. This may be, for example, a pre-determined interval after commencement of flow. EM receiver 42A may listen for a signal from downhole tool 22 which, if received, indicates that MP telemetry transmitter 42B does not need to send the MP signal to downhole tool 22. Also optionally, downlink telemetry transmitter 27 at the surface may send command signals to bypass transcoder 40.

It is not required that the commands sent by EM and MP telemetry be the same. For example, a certain command may be transmitted by sending a particular digital number encoded in an EM telemetry signal (e.g. "12" which may be represented by the binary number "1100"). The same command may be transmitted by sending some number of pulses by MP telemetry (e.g. three pulses). Downhole tool 22 may maintain separate correspondences between commands received by EM telemetry and actions to take and commands received by MP telemetry and corresponding actions to take. In the illustrated embodiment, downlink EM telemetry signals are decoded at decoder 47, translated by translator 48, and encoded for transmission as mud pulse signals by encoder 49. The EM telemetry signal may be encoded to contain error detection data, such as a cyclic redundancy check (CRC), such that encoder 49 may have a high level of confidence that it has received a valid downlink command.

The encoding and decoding schemes of MP telemetry transmitter 42B, as well as the bit rate at which transmitter 42B sends the information, may or may not be the same for different types of data. In some embodiments, translator 48 may treat different types of data in different ways. For example, if the data received by controller 44 is a command from downlink telemetry transmitter 27 (with or without parameters), then translator 48 may be configured not to modify the data; that is the bits of information are not changed when sent by MP telemetry transmitter 42B. However, if the data received by controller 44 is a measurement (e.g. one taken by a sensor), then the data may be compressed or adjusted for range and resolution so that it is compatible with MP telemetry transmitter 42B before being sent. In some embodiments, certain data is automatically rounded to a lower precision before transmission by MP telemetry so as to reduce the time required to transmit the data.

One advantage of some embodiments is that telemetry transcoder 40 can generate mud pulses at a downhole location from where the pulses may travel with relatively little distortion to a downhole tool 22. This is in contrast to the case where downlink MP telemetry pulses are generated at the surface and must pass through hoses and various items of surface equipment before entering the drill string. A pulsation damper may be employed to reduce noise that may affect MP signals.

As illustrated in FIG. 4, telemetry transcoder 40 may comprise a sub or section 45 which is insertable into the drill string. Section 45 may have uphole and downhole couplings 45A and 45B which may, for example, comprise threaded couplings, such as API threaded couplings, compatible with the couplings used in the drill string. Uphole and downhole ends of section 45 are electrically conductive and are isolated from one another by an electrically insulating portion 45C of section 45. The electrically insulating portion may be called a "gap".

EM telemetry receiver 42A may comprise an electrical potential monitor which is connected between the uphole and downhole ends of section 45 so as to monitor an electrical potential difference between these ends. Variations in this electrical potential difference caused by downhole telemetry signals from downlink telemetry transmitter 27 are detected by controller 44.

Figure 5A:
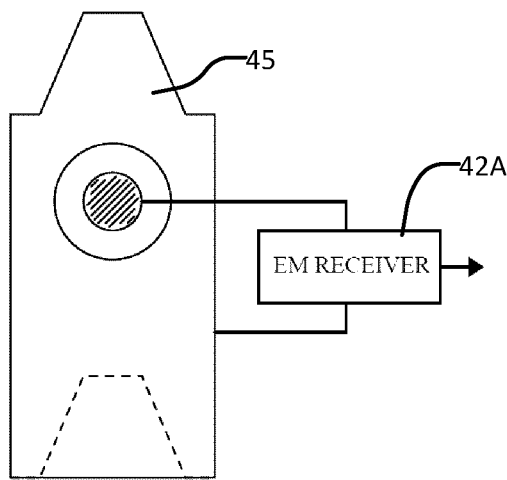
FIGS. 5A, 5B, and 5C are examples of electrode arrangements that may be provided on a telemetry transcoder for receiving downlink EM telemetry signals.
Figure 5B:
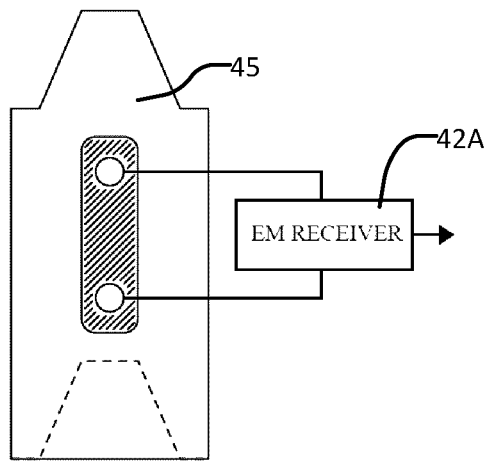
Figure 5C:
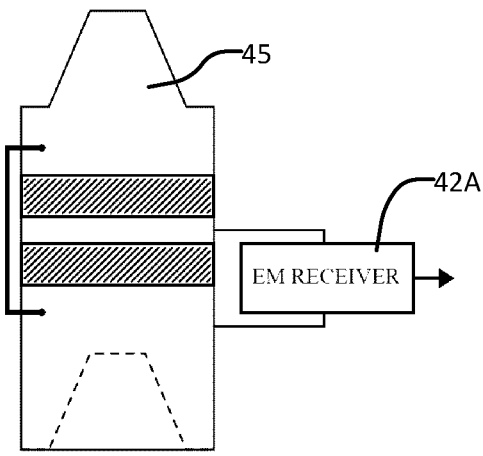

FIGS. 5A, 5B, and 5C show example alternative embodiments in which EM telemetry receiver 42A is connected to measure potential differences between a plurality of electrodes or between one or more electrodes and the rest of drill string 12. In such embodiments, top and bottom ends of the telemetry transcoder sub may remain in electrical contact with one another such that the presence of the telemetry transcoder sub does not impair detection at the surface of uplink EM telemetry signals from downhole tool 22. Despite such electrodes being less efficient than a gap sub for detecting EM telemetry signals, such signals may be readily detected when the transcoder is near the surface.

Downlink MP telemetry transmitter 42B may comprise a valve which, when actuated, partially blocks the flow of fluid through a bore of section 45. This partial blockage causes a negative pulse to be propagated down the bore of drill string 12 downstream from section 45. These negative pulses correspond to a drop in fluid pressure at downhole tool 22. Alternatively, the valve may be actuated to increase flow of fluid through a bore of section 45. This increase causes a positive pulse to be propagated down the bore of drill string 12 downstream from section 45. In either case, the valve may be actuated in a pattern so as to create a coded series of negative or positive pulses which propagate down the drill string to downhole tool 22 where the pulses can be detected at MP telemetry receiver 25.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to".
"connected", "coupled", or any variant thereof, means any connection or coupling, either direct or indirect, between two or more elements; the coupling or connection between the elements can be physical, logical, or a combination thereof.
"herein", "above", "below", and words of similar import, when used to describe this specification shall refer to this specification as a whole and not to any particular portions of this specification.
"or", in reference to a list of two or more items, covers all of the following interpretations of the word: any of the items in the list, all of the items in the list, and any combination of the items in the list.
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A telemetry transcoder comprising:
   an electromagnetic (EM) telemetry receiver comprising plural electrodes and an electrical potential monitor connected to measure one or more electrical potentials between the electrodes;
   a mud pulse (MP) telemetry transmitter;
   a buffer connected to store data received by the EM telemetry receiver; and
   a controller configured to retransmit data from the buffer by way of the MP telemetry transmitter conditionally and to suppress retransmission of the data in response to receiving an acknowledgement indicating receipt of the data by a downhole tool.

2. A telemetry transcoder according to claim 1 wherein the controller is configured to distinguish between commands and non-command numerical data in the received data and to process the non-command numerical data to reduce a size of the non-command numerical data before retransmitting the non-command numerical data.

3. A telemetry transcoder according to claim 2 wherein processing the non-command numerical data comprises rounding the non-command numerical data and/or compressing the non-command numerical data.

4. A telemetry transcoder according to claim 1 comprising a flow sensor wherein the controller is connected to monitor output from the flow sensor and to commence transmitting the received data in response to detecting an onset of flow.

5. A telemetry transcoder according to claim 4 wherein the controller is configured to wait for a time after detecting the onset of flow before retransmitting the data.

6. A telemetry transcoder according to claim 4 wherein the flow sensor comprises a pressure sensor.

7. A telemetry transcoder according to claim 1 wherein the controller comprises a command translator configured to identify a command in the received data and replace the command with a corresponding command before retransmitting the data.

8. A telemetry transcoder according to claim 1 comprising a gap sub wherein the electrodes are connected to opposing ends of the gap sub.

9. A telemetry transcoder according to claim 8 comprising couplings on opposed ends of the gap sub.

10. A method for data telemetry comprising:
    transmitting data from surface equipment by electromagnetic (EM) telemetry;
    receiving the data at a telemetry transcoder located below surface and above a downhole tool; and
    at the telemetry transcoder buffering the data and, in response to not receiving an acknowledgement from the downhole tool, retransmitting the data from the telemetry transcoder by mud pulse telemetry.

11. A method according to claim 10 comprising, in response to receiving the acknowledgement from the downhole tool suppressing retransmitting the data.

12. A method according to claim 11 wherein receiving the acknowledgement comprises detecting an EM signal comprising the acknowledgement.

13. A method according to claim 11 wherein receiving the acknowledgement comprises detecting a pressure signal comprising the acknowledgement.

14. A method according to claim 10, wherein the data is received at the telemetry transcoder at a first data rate and retransmitting the data comprises retransmitting the data at a second data rate lower than the first data rate.

15. A method according to claim 10 comprising, at the telemetry transcoder, processing the data to identify a command and replacing the command with a corresponding command before retransmitting the data.

16. A method according to claim 10 comprising, at the telemetry transcoder, processing the data to identify non-command numerical data and processing the non-command numerical data to reduce a size of the non-command numerical data before retransmitting the data.

17. A method according to claim 16 wherein processing the non-command numerical data comprises rounding the non-command numerical data to a lower precision.

18. A method according to claim 16 wherein processing the non-command numerical data comprises compressing the non-command numerical data.

19. A method according to claim 10 comprising, at the telemetry transcoder, detecting onset of a flow on condition and, in response to detecting the flow on condition, commencing retransmitting the data.

20. A method according to claim 19 comprising waiting for a period after detecting the flow on condition before commencing retransmitting the data.

21. A method according to claim 10 comprising drilling a wellbore using a drill string that includes the downhole tool, adding the telemetry transcoder to the drill string, and continuing drilling until the telemetry transcoder is downhole by at least a desired distance before transmitting the data.

22. A method according to claim 21 comprising, after the telemetry transcoder is downhole by at least the desired distance changing an encoding of the data transmitted from the surface equipment.

23. A method according to claim 22 wherein changing the encoding includes changing a number of cycles per bit.

24. A method according to claim 21 wherein changing the number of cycles per bit comprises increasing the number of cycles per bit to 20 or more cycles per bit.

25. A method according to claim 10 wherein the telemetry transcoder is at least 5 m below the surface when it receives the data.

26. A method for controlling a downhole tool, the method comprising:
    transmitting a command for the downhole tool from surface equipment by electromagnetic (EM) telemetry;
    receiving the command at a telemetry transcoder located in a wellbore below surface and above the downhole tool;
    at the telemetry transcoder, translating a mud pulse command signal corresponding to the command and transmitting the mud pulse command signal by mud pulse telemetry; and
    suppressing transmitting the mud pulse command signal by mud pulse telemetry in response to detecting an acknowledgement signal from the downhole tool at the telemetry transcoder.

27. The method according to claim 26 wherein the mud pulse command signal comprises negative pressure pulses.

28. The method according to claim 26 wherein the command comprises a command to change parameters used by the downhole system to transmit data to the surface equipment.

29. The method according to claim 28 wherein the parameters comprise one or more of frequency, bit rate, encoding modulation type, and power transmission level.

30. The method according to claim 26 wherein the command comprises a command instructing the downhole system to perform at least one of the following: wake up or energize part of the downhole tool; switch to a particular desired operating mode; transmit acquired data and/or diagnostic data using an uplink telemetry system; switch from using one uplink telemetry system to using another uplink telemetry system; and enter a power-saving mode.

31. The method according to claim 26 wherein the telemetry transcoder is located within a casing of the wellbore.

\* \* \* \* \*